(12) United States Patent
Feng et al.

(10) Patent No.: US 12,356,093 B2
(45) Date of Patent: Jul. 8, 2025

(54) EVENT VISION SENSORS WITH EVENT DATA COMPRESSION, INCLUDING EVENT VISION SENSORS WITH IN-PIXEL EVENT DATA COMPRESSION, AND ASSOCIATED SYSTEMS, DEVICES, AND METHODS

(71) Applicant: OMNIVISION TECHNOLOGIES, INC., Santa Clara, CA (US)

(72) Inventors: Kaijun Feng, Redwood City, CA (US); Andreas Suess, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 254 days.

(21) Appl. No.: 18/329,378

(22) Filed: Jun. 5, 2023

(65) Prior Publication Data
US 2024/0406588 A1 Dec. 5, 2024

(51) Int. Cl.
*H04N 25/47* (2023.01)
*H04N 19/172* (2014.01)
*H04N 25/42* (2023.01)
*H04N 25/77* (2023.01)

(52) U.S. Cl.
CPC ........... *H04N 25/47* (2023.01); *H04N 19/172* (2014.11); *H04N 25/77* (2023.01)

(58) Field of Classification Search
CPC ........ H04N 25/42; H04N 25/47; H04N 25/77; H04N 19/172
See application file for complete search history.

(56) References Cited

U.S. PATENT DOCUMENTS 11,729,534 B1* 8/2023 Suess ..................... H04N 25/59
11,823,218 B2* 11/2023 Berner ................... H04N 25/47
11,991,465 B2* 5/2024 Suess .................... H04N 25/778

OTHER PUBLICATIONS

N. Khan et al., "Time-Aggregation-Based Lossless Video Encoding for Neuromorphic Vision Sensor Data," IEEE Internet of Things Journal, vol. 8, No. 1, Jan. 1, 2021, 14 pages.
L. Pancheri et al., "Compact analog counting SPAD pixel with 1.9% PRNU and 530ps time gating," University of Trento, Integrated Optical Sensors and Interfaces, 2013, 4 pages.
(Continued)

*Primary Examiner* — Marly S Camargo
(74) *Attorney, Agent, or Firm* — Perkins Coie LLP; Daniel L. Jackstadt

(57) ABSTRACT

Event vision sensors with event data compression (and associated systems, devices, and methods) are disclosed herein. In one embodiment, an event vision sensor includes a plurality of event vision pixels. Each event vision pixel of the plurality is configured to generate event data based on events indicated in incident light received from an external scene, and includes a compression circuit configured to compress the event data prior to readout of the event data from the event vision pixel. Each compression circuit can include a time aggregation circuit that is configured to track a number of the events detected by the corresponding event vision pixel over a specified timing window. The compressed event data can be read out from the event vision sensors and used to generate a pseudo-frame. The event vision sensor can optionally perform frame-level compression on the pseudo-frame.

23 Claims, 8 Drawing Sheets

(56) References Cited

OTHER PUBLICATIONS

A. Angelopoulos et al., "Event-Based Near-Eye Gaze Tracking Beyond 10,000 Hz," http://angelopoulos.ai/blog/posts/ebv-eye, 2022, 12 pages.
Y. Yaffe et al., "Dynamic Vision Sensor—The Road to Market," ICRA'17 Workshop on "Event-based Vision," Jun. 2, 2017, 43 pages.
E. Panina et al., "Compact CMOS Analog Counter for SPAD Pixel Arrays," IEEE Transactions on Circuits and Systems—II: Express Briefs, vol. 61, No. 4, Apr. 2014, 5 pages.

* cited by examiner

EVENT VISION SENSORS WITH EVENT DATA COMPRESSION, INCLUDING EVENT VISION SENSORS WITH IN-PIXEL EVENT DATA COMPRESSION, AND ASSOCIATED SYSTEMS, DEVICES, AND METHODS

TECHNICAL FIELD

This disclosure relates generally to event vision sensors. For example, several embodiments of the present technology relate to event vision sensors that employ on-chip event data compression, such as in-pixel event data compression.

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following figures, in which like or similar reference characters are used to refer to like or similar components throughout unless otherwise specified.

Figure 1:
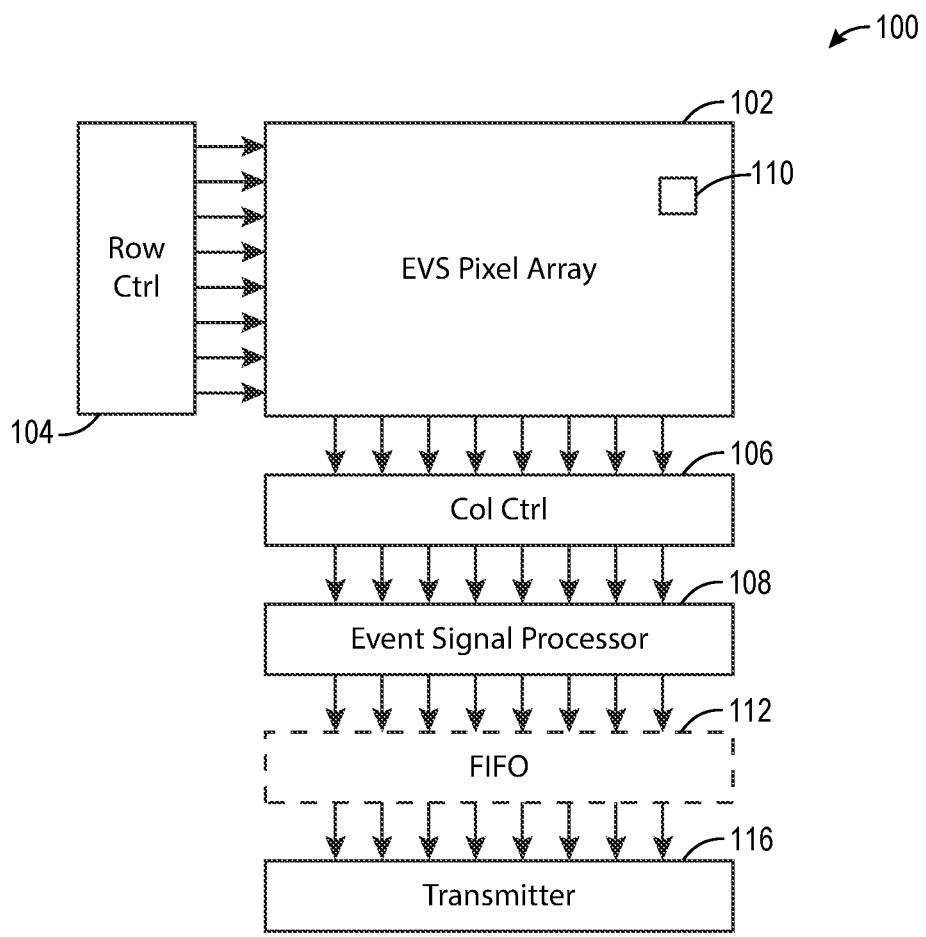
FIG. 1 is a partially schematic block diagram of an event vision sensor configured in accordance with various embodiments of the present technology.

Skilled artisans will appreciate that elements in the figures are illustrated for simplicity and clarity and are not necessarily drawn to scale. For example, the dimensions of some of the elements in the figures may be exaggerated relative to other elements to aid in understanding of various aspects of the present technology. In addition, common but well-understood elements or methods that are useful or necessary in a commercially feasible embodiment are often not depicted in the figures or described in detail below to avoid unnecessarily obscuring the description of various aspects of the present technology.

DETAILED DESCRIPTION

The present disclosure relates to event vision sensors. For example, several embodiments of the present technology are directed to event vision sensors that employ on-chip, such as in-pixel and/or frame-level event data compression. In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for ease of description to describe one element's or one feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) that illustrated in the figures, and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. Overview

Active pixel sensors (e.g., CMOS imaging systems) commonly employ an array of active pixels having an integration time that is globally defined. Thus, active pixels in an active pixel sensor typically have an identical integration time, and each pixel in the array is typically converted into a digital signal regardless of its content (e.g., regardless of whether there has been a change in an external scene that was captured by a pixel since the last time the pixel was read out). In other words, image data generated by active pixels in, for example, CMOS imagers are read out in frames of known size regardless of whether there are events in an external scene.

In comparison, event vision sensors (e.g., event driven sensors or dynamic vision sensors) read out a pixel and/or convert a corresponding pixel signal into a digital signal when the pixel captures a change (e.g., an event) in an external scene. In other words, pixels of an event vision sensor that do not detect a change in the external scene are not read out and/or pixel signals corresponding to such pixels are not converted into digital signals. Thus, each pixel of an event vision sensor can be independent from other pixels of the event vision sensor, and only pixels that detect a change in the external scene need be read out, and/or have their corresponding pixel signals converted into digital signals or recorded (thereby saving power). As such, an event vision sensor does not need to record an entire regular image, and therefore is not burdened with having to capture and record all of the highly redundant information of a normal image from frame to frame. As a result, an event vision sensor can be employed to detect movement or motion in an external scene (e.g., as opposed to being employed to capture/read out entire frames of images or video), while enabling (i) use of low data rates and (ii) a realization of ultra-high frame rates or speed capabilities.

Even so, when an event vision sensor records events detected in an external scene, the event vision sensor typically records the location of where each event is detected (e.g., the x-y coordinates of an event vision pixel in an array of such pixels), the polarity of change (e.g., brighter or darker) in photocurrent for that event, and/or a timing corresponding to when the event occurred or was detected. Thus, for a megapixel array of event vision pixels, an event vision sensor typically records approximately 25 bits of information (e.g., ten bits of information to record an x-location of the corresponding event vision pixel of the megapixel array, ten bits of information to record a y-location of the corresponding event vision pixel, one bit of information to record the polarity of change corresponding to the event, and four bits of information to record a timestamp representing when that event was detected) for each individual event detected by an event vision pixel of the megapixel array. When events are sparse and only a few events are detected by event vision pixels of an array at once or within a short period of time, recording 25 bits of information for each individual event is certainly more efficient than recording entire frames of images or video in which only a few event vision pixels of an array have detected events. But when a large number of event vision pixels detect events at once or several events are detected within a short period of time, recording 25 bits of information for each individual event can quickly erode the relative efficiency of event vision sensors in comparison to active pixel sensors.

In addition, it is rare for an event vision sensor to detect and register an isolated event that corresponds to legitimate activity in an external scene monitored by the event vision sensor. More often, that isolated event corresponds to noise. Instead, activity in an external scene often includes some spatial or temporal redundancy. For example, as an individual moves across an external scene monitored by an event vision sensor, that same individual is detected in events registered by several different groups of event vision pixels across an array of such pixels in the event vision sensor. Thus, there often exists spatial redundancy in the information captured by the event vision sensor as the individual moves across the external scene. As another example, when an event vision sensor monitors an external scene that includes a flashing yellow traffic light, a same group of event vision pixels of the event vision sensor will detect events whenever the yellow light changes (e.g., from on to off, and/or from off to on). Stated another way, the same group of event vision pixels will detect multiple instances of the same activity over time. As such, there exists some temporal redundancy in the information captured by the event vision pixel as the traffic light changes over a short amount of time.

Given the problems discussed above, the present technology offers an on-chip compression solution that can be utilized for reducing the amount of information used to record events detected by an event vision sensor. For example, several embodiments of the present technology are directed to event vision sensors that include event vision pixels with time aggregation circuits capable of performing in-pixel compression (e.g., temporal aggregation) of event information. As a specific example, several event vision pixels of the present technology include counters that are configured to count the number of events (e.g., the number of UP events, the number of DOWN events, or a difference between the number of UP events and the number of DOWN events) that are detected by corresponding event vision pixels over a specified period of time. In turn, the count(s) maintained by event vision pixels can be read out and combined to form one or more pseudo-frames that correspond to the specified period of time. In some embodiments, the event vision sensor can then optionally perform frame-level compression on the pseudo-frames (e.g., to further reduce the amount of information used to record events detected by the event vision pixels over the specified period of time). Therefore, instead of reading out events from event vision pixels and recording them individually, event vision sensors configured in accordance with various embodiments of the present technology are configured to (i) encode events detected by a same event vision pixel and occurring within a same timing window as a group using in-pixel compression circuits and (ii) to read out counts corresponding to the group as event data that can be used to form pseudo-frames. As a result, event vision sensors configured in accordance with various embodiments of the present technology can read out event data from event vision pixels and record the event data using a using a lesser number of bits than is typically used by event vision sensors that lack an on-chip compression solution.

In other words, the present technology offers an on-chip compression solution (e.g., an in-pixel compression solution and/or a frame-level compression solution) for reducing the amount of information required to record events. In turn, the amount of memory utilized to record such events is reduced in comparison to event vision sensors that lack an on-chip compression solution, which can lead to realizing longer recording times for a fixed amount of memory because a larger amount of event data can be stored to such memory before the memory becomes full. Furthermore, such an on-chip compression solution offered by the present technology is expected to reduce latency, enable use of even lower data rates, and utilize less power in comparison to event vision sensors that lack an on-chip compression solution and/or in comparison to imaging systems that perform compression off-chip (e.g., outside of an event vision sensor of the imaging system).

B. Selected Embodiments of Event Vision Sensors with Event Data Compression, and Associated Systems, Devices, and Methods FIG. 1 is a partially schematic block diagram of an event vision sensor 100 configured in accordance with various embodiments of the present technology. As shown, the event vision sensor 100 includes an array 102 of event vision pixels 110, row control circuitry 104, column control circuitry 106, an event signal processor 108, and a transmitter 116. In some embodiments, the event vision sensor 100 can additionally include a memory 112. The memory 112 is shown as a FIFO buffer 112 in FIG. 1 as an example. In other embodiments, the memory 112 can be another suitable type of buffer or memory, and/or can be omitted or positioned at other locations (e.g., within the event signal processor 108 or the transmitter 116, or after the transmitter 116) in the event vision sensor 100.

The array 102 includes a plurality of event vision pixel circuits 110 arranged in rows and columns (the rows and columns are not shown in FIG. 1). As discussed in greater detail below, event vision pixels 110 are configured to capture changes (e.g., events) in an external scene. To this end, each event vision pixel 110 can include (i) a photosensor, such as a photodiode, configured to photogenerate charge or photocurrent in response to incident light received from the external scene; (ii) a photocurrent-to-voltage converter coupled to the photosensor to convert photocurrent generated by the photosensor to a voltage; and (iii) a filter amplifier coupled to the photocurrent-to-voltage converter to generate a filtered and amplified signal in response to the voltage received from the photocurrent-to-voltage converter. The event vision pixels can further include a threshold comparison circuit or stage to generate and receive handshake signals in response to events asynchronously detected in incident light received from the external scene. Alternatively, a threshold comparison circuit may be included in circuitry (e.g., in the event signal processor 108) peripheral or external to the event vision pixels of the array 102, such as within column read out circuitry. Event vision pixels configured in accordance with the present technology can further include time aggregation circuits or stages that facilitate encoding events that occur or are detected within a specified time window together, thereby compressing a total amount information required for recording events detected by the event vision pixels.

The row control circuitry 104 and the column control circuitry 106 of FIG. 1 are used to control the rows and columns, respectively, of the event vision pixels 110 in the array 102. For example, the row control circuitry 104 and/or the column control circuitry 106 can be configured to reset specific (e.g., individual ones or rows of) event vision pixels 110 of the array 102, and/or to read out (e.g., individual ones or rows of) event vision pixels 110 from the array 102 (e.g., along corresponding column bitlines connected to the event vision pixels 110).

Event data read out from event vision pixels 110 of the array 102 can be passed to the event signal processor 108 of the event vision sensor 100 for processing. As discussed in greater detail below, processing performed by the event signal processor 108 can optionally include compressing pseudo-frames of event data read out from event vision pixels 110 of the array 102. Event data processed by the event signal processor 108 can be provided to the transmitter 116 for transmitting the event data out of the event vision sensor 100, such as to a receiver (not shown) of a corresponding imaging system. Additionally, or alternatively, all or a subset of the event data can be stored in memory 112 (e.g., before or after being provided to the event signal processor 108 and/or the transmitter 116).

Figure 2:
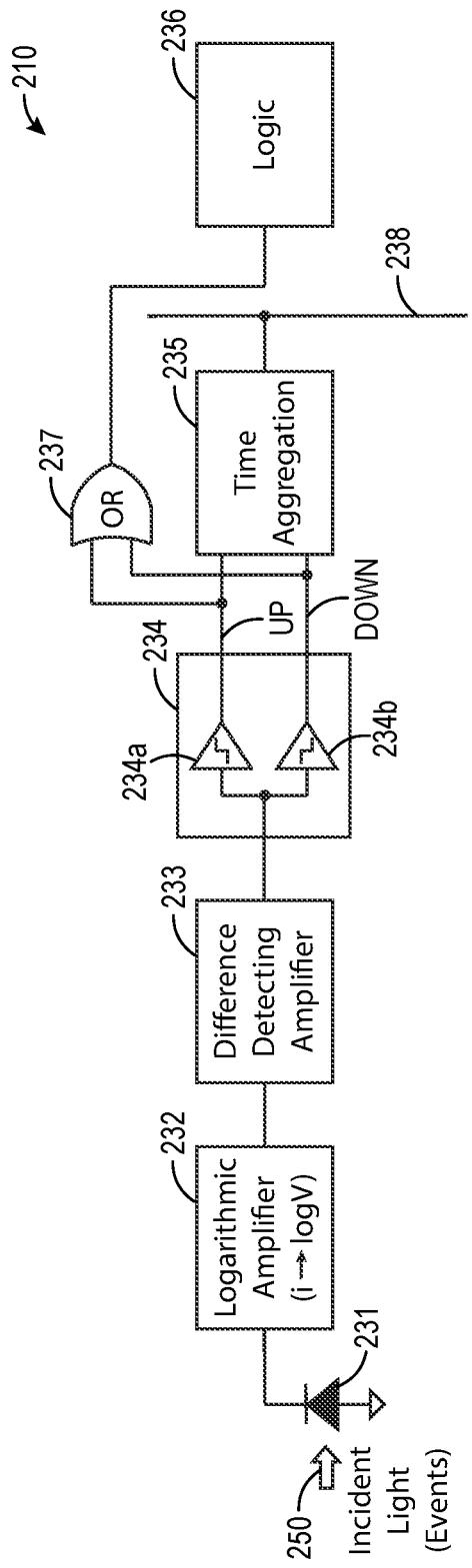
FIG. 2 is a partially schematic block diagram illustrating an event vision pixel configured in accordance with various embodiments of the present technology.

FIG. 2 is a partially schematic block diagram illustrating an example of an event vision pixel 210 configured in accordance with various embodiments of the present technology. It is appreciated that the illustrated event vision pixel circuit 210 may be an example of one of the event vision pixel circuits 110 included in the array 102 of FIG. 1, or of another event vision pixel circuit of the present technology. As shown, the event vision pixel 210 includes a photodiode 231 configured to photogenerate charge or photocurrent in response to incident light 250 received from an external scene. The photodiode 231 is coupled to a logarithmic amplifier 232 that is configured to convert photocurrent generated by the photodiode 231 to a voltage. In various examples, the logarithmic amplifier 232 is configured to generate the voltage by transducing the momentary photocurrent received from the photodiode 231. A difference detecting amplifier 233 is coupled to the logarithmic amplifier 232 to generate a filtered and amplified signal in response to differences that are detected in the voltage received from the logarithmic amplifier 232. In one example, the difference detecting amplifier 233 is configured to compare the momentary log-intensity of the voltage output of the logarithmic amplifier 232 with a reference level based on a reset condition or a last event.

Event generating comparators 234 are coupled to the difference detecting amplifier 233 to compare the filtered and amplified signal received from the difference detecting amplifier 233 with thresholds to asynchronously detect events that occur in the external scene in response to the incident light 250. In one example, the event generating comparators 234 are configured to discriminate if said signal difference is significant enough to trigger an event. In the illustrated embodiment, the event generating comparators 234 includes a first comparator 234a configured to detect whether the signal difference corresponds to an 'UP' event (e.g., a change in the intensity of light incident on the photodiode 231 from darker to brighter and greater than a threshold). The event generating comparators 234 further include a second comparator 234b configured to detect whether the signal difference corresponds to a 'DOWN' event (e.g., a change in the intensity of light incident on the photodiode 231 from brighter to darker and greater than a threshold).

The event vision pixel 210 of FIG. 2 further includes a time aggregation circuit or stage 235 (also referred to herein as an "in-pixel compression circuit," or "compression circuit") coupled to the outputs of the event generating comparators 234. As discussed in greater detail below with reference to FIGS. 3-10, the time aggregation circuit 235 can include one or more counters configured to count events (UP events and/or DOWN events) that are detected by the event generating comparators 234 during specified timing windows. At the end of a timing window, count(s) maintained by the one or more counters can be read out from the event vision pixel 210 onto a column or bit line 238 as event data. The event data can include (a) a count representing the number of UP events detected by the corresponding event vision pixel during the timing window, (b) a count representing the number of DOWN events detected by the corresponding event vision pixel during the timing window, and/or (c) a count representing a difference between the number of UP events detected by the corresponding event vision pixel during the timing window and the number of DOWN events detected by the corresponding event vision pixel during the timing window.

As discussed in greater detail below with reference to FIGS. 4 and 10, the time aggregation circuit 235 facilitates encoding several events that occur within a same timing window together, instead of individually. For example, in the case of a megapixel array, instead of reading out events detected by the event vision pixel 210 individually and using approximately 25 bits of information to individually record each of those events (e.g., ten bits to record the x-location of the event vision pixel 210 in a megapixel array, ten bits to record the y-location of the event vision pixel 210 in the megapixel array, one bit to record the polarity of change corresponding to each individual event, and four bits to record a timestamp representing when each individual event was detected by the event vision pixel 210), events that are detected by the event vision pixel 210 during a same timing window can be read out and recorded as a group using a lesser number of bits. More specifically, at or after an end of a given timing window, a count representing (i) the number UP events detected by the event vision pixel 210 during the timing window, (ii) the number of DOWN events detected by the event vision pixel 210, and/or (iii) a difference between the number of UP events detected during the timing window and the number of DOWN event detected during the timing window, can be read out of the event vision pixel 210 as event data. In turn, the event data can be recorded using (a) a single instance of ten bits to reflect the x-location of the event vision pixel 210 in the megapixel array, (b) a single instance of ten bits to reflect the y-location of the event vision pixel 210 in the megapixel array, (c) a specified number of bits (e.g., two to four bits) to reflect the count value, and (d) a specified number of bits (e.g., four bits) to identify the corresponding timing window (e.g., via a timestamp that reflects the start or the end of the timing window, a timing window sequence identifier, a frame-count number, etc.). In other words, the time aggregation circuit 235 compresses the amount of information required to record events detected by the event vision pixel 210 by using a single x-location data entry, a single y-location data entry, and a single timestamp data entry for all events that are detected by the event vision pixel 210 within a same timing window.

Referring again to FIG. 2, the event vision pixel 210 optionally includes scanner and readout logic 236 coupled to the outputs of the event generating comparators 234 via a logic gate 237. In the illustrated embodiment, the logic gate 237 is an 'OR' gate and is configured to trigger a latch in the scanner and readout logic 236 whenever the event generating comparators 234 detects an event (e.g., an UP event or a DOWN event). Thus, triggering of the latch indicates that the event vision pixel 210 has detected at least one event during a given timing window. Although not shown in FIG. 2, the scanner and readout logic 236 can be coupled to row control circuitry (e.g., the row control circuitry 104 of FIG. 1) of a corresponding event vision sensor, and can be used to request readout of the event vision pixel 210 whenever the latch is triggered. In this manner, the scanner and readout logic 236 and the logic gate 237 can be leveraged to ensure that the event vision pixel 210 is read out only when the event vision pixel 210 has detected at least one event within a given timing window. Stated another way, the scanner and readout logic 236 and the logic gate 237 can be leveraged to ensure that count(s) maintained by the event vision pixel 210 is/are not read out of the event vision pixel 210 when those count(s) indicate(s) that the event vision pixel 210 did not detect at least one event during the timing window.

In other embodiments, the scanner and readout logic 236 of the event vision pixel 210 can include a first latch coupled to the output of the first comparator 234a, and a second latch different from the first latch and coupled to the output of the second comparator 234b. The logic gate 237 can be omitted in these embodiments. The first latch can be triggered when the event vision pixel 210 detects at least one UP event during a given timing window, and the second latch can be triggered when the event vision pixel 210 detects at least one DOWN event during the given timing window. Including separate latches in the scanner and readout logic 236 for UP events and DOWN events can provide greater granularity or control over the readouts of different event counts maintained by the time aggregation circuit 235. For example, using separate latches can facilitate reading out an UP event count only when the event vision pixel 210 detects at least one UP event during a given timing window (e.g., regardless of whether the event vision pixel 210 detects a DOWN event during the given timing window), and reading out a DOWN event count only when the event vision pixel 210 detects at least one DOWN event during a given timing window (e.g., regardless of whether the event vision pixel 210 detects an UP event during the given timing window).

For the sake of clarity and understanding, a brief summary of operation of the event vision pixel 210 illustrated in FIG. 2 will now be provided. The event vision pixel 210 functions such that, when an event occurs in an external scene, that event is indicated in the incident light 250 that is received by the photodiode 231 as a quick or sudden change in intensity or brightness. In other words, if the external scene is static and there is no event occurring, the brightness of incident light 250 remains substantially unchanged. As such, the photocurrent generated by the photodiode 231 remains substantially constant. If, however, an event occurs (e.g., movement, changes of illumination, albedo, excitance, etc.) in the external scene, the event is indicated with an asynchronous quick or sudden change in the brightness of incident light 250. The change in brightness can be from darker to brighter or from brighter to darker. Thus, there is an asynchronous change or delta in the photocurrent generated by the photodiode 231. The change or delta in the photocurrent is converted to a voltage by the logarithmic amplifier 232, filtered and amplified by the difference detecting amplifier 233, detected with the event generating comparators 234, and counted by the time aggregation circuit 235. When the event is a first event to occur within a given timing window, the event can trigger a latch in the scanner and readout logic 236 via the logic gate 237, thereby informing row control circuitry (not shown) that the event vision pixel 210 has detected at least one event for the given timing window and requesting read out of the event vision pixel 210 (e.g., at or after the end of the timing window). The above process can be repeated for each event that occurs within the given timing window.

At or after the end of a given timing window and assuming that the event vision pixel 210 has detected at least one event within the given timing window (e.g., as indicated by the triggering of a latch in the scanner and readout logic 236), event data can be read out of the event vision pixel 210 sequentially or simultaneously with event data generated by other event vision pixels of an array that includes the event vision pixel 210. Event data detected by the event vision pixels of the array can be read out from the array asynchronously and/or may be read out in an order that differs from the order in which the event data was generated. Digital timestamps, sequence identifiers, frame-count numbers, etc. associated with each timing window can help to ensure that events detected by different event vision pixels but corresponding to a same timing window are correlated/associated with one another (e.g., for storage or reconstruction). On the other hand, when the event vision pixel 210 has not detected at least one event within a given timing window (e.g., as indicated by an untriggered latch in the scanner and readout logic 236), event data is not read out of the event vision pixel 210 for the given timing window.

It is appreciated therefore that an event vision sensor (e.g., the event vision sensor 110 of FIG. 1) including event vision pixel circuits (e.g., the event vision pixel circuit 210 of FIG. 2) does not need to record an entire regular image, and therefore is not burdened with having to capture and record all of the highly redundant information of a normal image from frame to frame. Rather, in various embodiments, the event vision sensor can record only events and/or counts of events. For example, the event vision sensor 100 of FIG. 1 can record the location of where events are detected (e.g., the x-y coordinates of an event vision pixel 110 in the array 102 of FIG. 1), the count(s) of UP and/or DOWN events (or a difference between such counts) detected during a given timing window, and/or a timing or identifier corresponding to the given timing window. In other words, the event vision sensor 100 can be employed to detect movement or motion in an external scene (e.g., as opposed to being employed to capture/read out entire frames of images or video) and can facilitate encoding events in groups, thereby compressing the total amount of information required to record events detected by the event vision pixel 110 of the array 102, enabling use of lower data rates, and enabling realization of ultra-high frame rates or speed capabilities.

Figure 3:
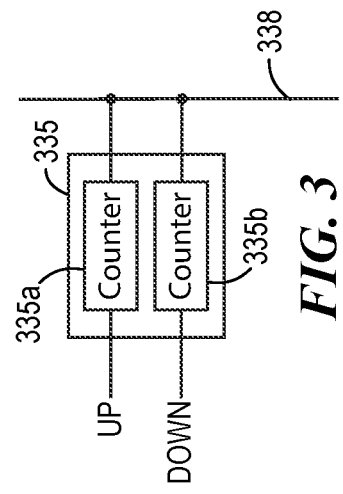
FIG. 3 is a partially schematic block diagram of a time aggregation circuit configured in accordance with various embodiments of the present technology.

FIG. 3 is a partially schematic block diagram of a time aggregation circuit 335 configured in accordance with various embodiments of the present technology. It is appreciated that the illustrated time aggregation circuit 335 may be an example of the time aggregation circuit 235 included in the event vision pixel 210 of FIG. 2, or of another time aggregation circuit of the present technology. As shown, the time aggregation circuit 335 includes a first counter 335a and a second counter 335b. In some embodiments, the first counter 335a is a first ripple counter and/or the second counter 335b is a second ripple counter. The first counter 335a is configured to (a) receive a signal UP from an event generating comparator of a corresponding event vision pixel that indicates when the corresponding event vision pixel has detected an UP event, and (b) count a number of times the signal UP is asserted during a timing window. Similarly, the second counter 335b is configured to (a) receive a signal DOWN from an event generating comparator of a corresponding event vision pixel that indicates when the corresponding event vision pixel has detected a DOWN event, and (b) count a number of times the signal DOWN is asserted during the timing window.

For the sake of clarity and understanding, operation of the time aggregation circuit 335 will now be discussed with reference to FIGS. 2 and 3. The first counter 335a can be configured to receive an output (signal UP) of the first comparator 234a of the event generating comparators 234 in the event vision pixel 210, and the second counter 335b can be configured to receive an output (signal DOWN) of the second comparator 234b of the event generating comparators 234. Continuing with this example, the first and second counters 335a and 335b can be reset at or before a beginning of a timing window. Each time the first comparator 234a detects an UP event, the first comparator 234a can assert or pulse the signal UP. In turn, the first counter 335a can update (e.g., increment) a counter value representing the number of times that the first comparator 234a asserts or pulses the signal UP during the timing window. The counter value maintained by the first counter 335a is referred to herein as an UP event count. Similarly, each time the second comparator 234b detects a DOWN event using the second comparator 234b, the second comparator 234b can assert or pulse the signal DOWN. In turn, the second counter 335b can update (e.g., increment) a counter value representing the number of times that the second comparator 234b asserts or pulses the signal DOWN during the timing window. The counter value maintained by the second counter 335b is referred to herein as a DOWN event count.

Assuming that the event vision pixel 210 detects at least one event (UP or DOWN) during the timing window, the latch in the scanner and readout logic 236 of the event vision pixel 210 will be triggered via the logic gate 237, thereby signaling to (e.g., the corresponding row control circuitry of) the corresponding event vision sensor that the event vision pixel 210 should be read out. Thus, at or after the end of the timing window, the event vision sensor can read out the UP event count and the DOWN event count onto a column bitline 338. The UP event count and the DOWN event count can be read out of the event vision pixel 210 in any order relative to each other and/or relative to other event counts maintained by other event vision pixels of the event vision sensor. On the other hand, when the event vision pixel 210 does not detect at least one event (UP or DOWN) during the timing window, the latch in the scanner and readout logic 236 will not be triggered via the logic gate 237. As such, the event counts maintained by the first and second counters 335a and 335b for the corresponding timing window will not be read out onto the column bitline 338 at or after the end of the timing window. Regardless of whether the event vision pixel 210 detects at least one event during the timing window, the event counts maintained by the first and second counters 335a and 335b can be reset at or before a beginning of a next timing window.

Figure 4:
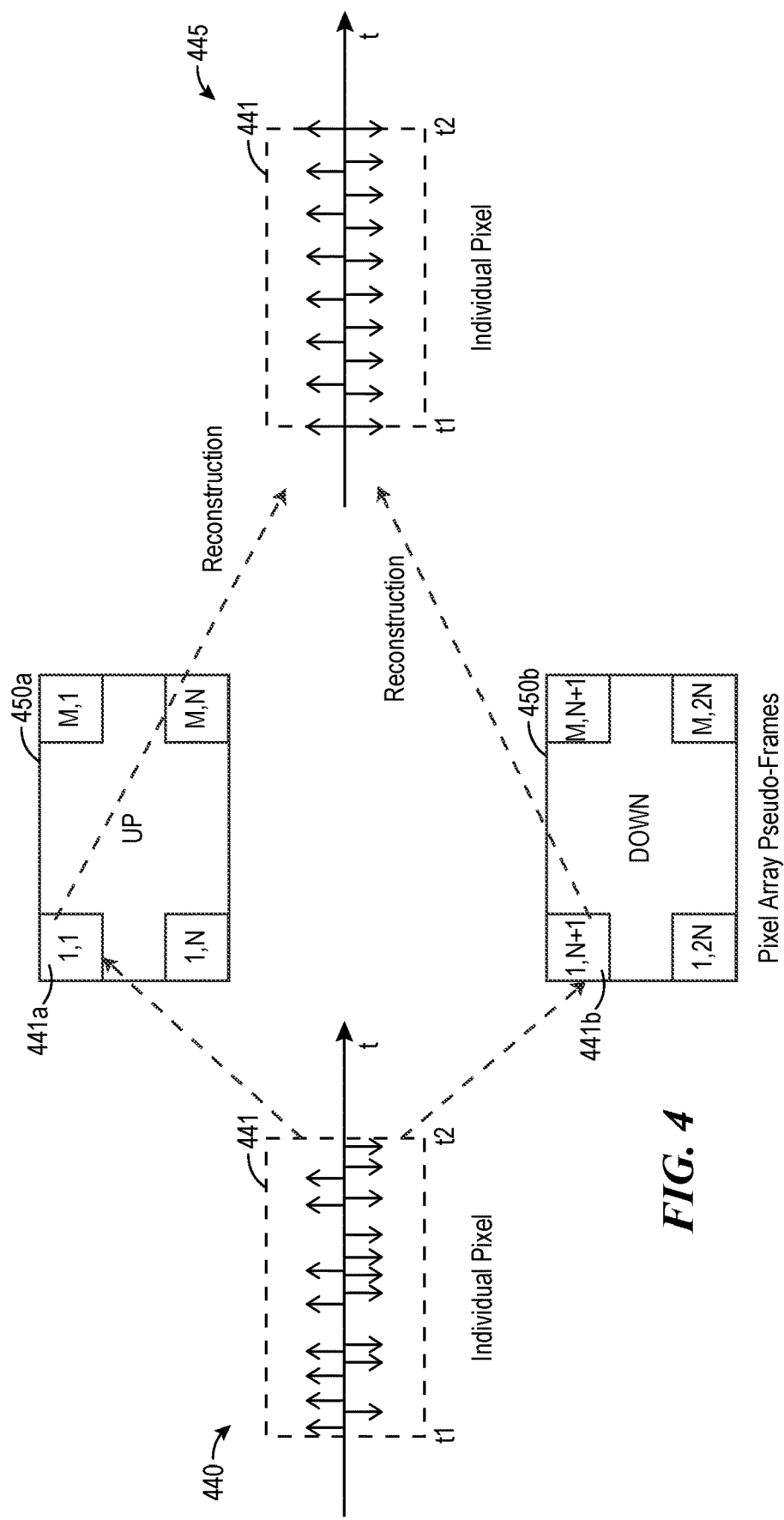
FIG. 4 is a diagram illustrating a method of event data compression in accordance with various embodiments of the present technology.

FIG. 4 is a diagram illustrating an overview of event data compression that can be performed using time aggregation circuits of event vision pixels configured in accordance with various embodiments of the present technology. FIG. 4 includes a plot 440 of UP events and DOWN events detected by an event vision pixel during a timing window 441 between time t1 and time t2. More specifically, the plot 440 illustrates that the event vision pixel detected eight (8) UP events and ten (10) DOWN events during the timing window 441 and in the order shown. As discussed above, the UP events can be counted using a first counter (e.g., the first counter 335a of FIG. 3) of the event vision pixel, and the DOWN events can be counted using a second counter (e.g., the second counter 335b of FIG. 3). The UP event count maintained by the first counter and the DOWN event count maintained by the second counter can be read out of the event vision pixel at or after the end of the timing window 441 (e.g., at or after time t2). Note that the UP event count and the DOWN event count merely reflect the number of UP events and/or DOWN events, respectively, detected by the event vision pixel during the timing window 441. Stated another way, the counts merely reflect the aggregate number of UP events and DOWN events, respectively, that are detected by the event vision pixel over the timing window 441 between time t1 and time t2. Thus, the counter values maintained by the counters do not record, track, or otherwise reflect the exact timing of when, during the timing window 441, each individual event was detected by the event vision pixel. Therefore, such in-pixel compression of event data performed by the event vision pixel can be considered a form of lossy compression in which temporal information of individual events is lost.

In some embodiments, the UP event count and/or the DOWN event count read out of the event vision pixel can be combined with other event counts read out of other event vision pixels of an event vision sensor to form pseudo-frames. For example, as shown in FIG. 4, the UP event count corresponding to the timing window 441 of the plot 440 can be combined with other UP event counts read out of other event vision pixels for the same timing window 441 to form a first pseudo-frame 450a. Similarly, the DOWN event count corresponding to the timing window 441 of the plot 440 can be combined with other DOWN event counts read out from the other event vision pixels for the same timing window 441 to form a second pseudo-frame 450b that is different from the first pseudo-frame 450a. Alternatively, UP event counts and DOWN event counts corresponding to the timing window 441 of the plot 440 can both be combined in a single pseudo-frame with other UP event counts and DOWN event counts read out from other event vision pixels for the same timing window 441. At this point, as discussed in greater detail below with reference to FIG. 11, the event vision sensor can optionally perform frame-level compression on the first pseudo-frame 450a and/or on the second pseudo-frame 450b.

Frames of event counts read out of event vision pixels of an array for different timing windows are referred to herein as 'pseudo-frames' because event data included in each pseudo-frame represents the number of events detected by the event vision pixels over a specified timing window. Such event data is proportional to a change of contrast or a change of information in the external scene. Frames of image data, on the other hand, conventionally relate to an exposure time, and the image data included in such frames represents an amount of photon/electrons that are generated by light incident on a photosensor of each pixel during the exposure time.

Referring again to FIG. 4, a plot 445 is shown to illustrate reconstruction of event data from the pseudo-frames 450a and 450b. More specifically, during reconstruction, event data corresponding to UP events detected by the event vision pixel during the timing window 441 can be reconstructed using the first pseudo-frame 450a, and event data corresponding to DOWN events detected by the event vision pixel during the timing window 441 can be reconstructed using the second pseudo-frame 450b. Because temporal information regarding exactly when each of the individual events occurred during the timing window 441 is lost during in-pixel compression of the event data, assumptions are made during reconstruction regarding when each of the events occurred within the timing window 441. In the illustrated example, it is assumed that the event vision pixel detected the eight UP events at uniform intervals across the timing window 441 and that the event vision pixel detected the ten DOWN events at uniform intervals across the timing window 441. Therefore, during reconstruction, the eight UP events can be uniformly distributed across the timing window 441, and the ten DOWN events can be uniformly distributed across the timing window 441.

Other assumptions regarding the distributions of UP events and/or DOWN events across a timing window are of course possible and within the scope of the present technology. For example, it can be assumed that the event vision pixel exponentially detected UP events and/or DOWN events across the timing window 441. Furthermore, although the same assumption is made for both UP events and DOWN events across the timing window 441 in the illustrated example, a different assumption can be made during reconstruction for UP events than for DOWN events. Additionally, or alternatively, multiple assumptions can be made for UP events or for DOWN events during reconstruction. For example, it can be assumed that the DOWN events were detected by the event vision pixel at uniform intervals during the first half of the timing window, and then were exponentially detected by the event vision pixel during the second half of the timing window. Moreover, for a same pseudo-frame, assumptions made during reconstruction of event data corresponding to one event vision pixel can but need not be the same as assumptions made during reconstruction of event data corresponding to another event vision pixel. Further, for different pseudo-frames (e.g., different UP event pseudo-frames or different DOWN event pseudo-frames) corresponding to a same event vision pixel, assumptions made during reconstruction of event data from those different pseudo-frames can but need not be the same across the different pseudo-frames.

Figure 5:
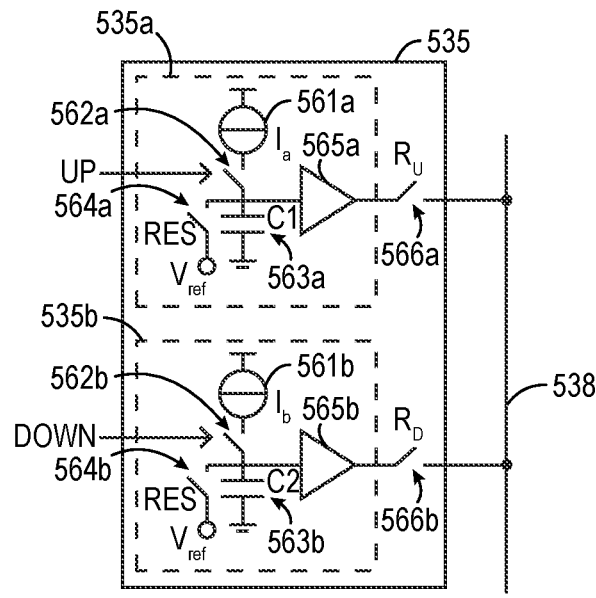
FIG. 5 is a partially schematic block diagram of another time aggregation circuit configured in accordance with various embodiments of the present technology.

FIG. 5 is a partially schematic block diagram of another time aggregation circuit 535 configured in accordance with various embodiments of the present technology. It is appreciated that the illustrated time aggregation circuit 535 may be an example of the time aggregation circuit 235 included in the event vision pixel 210 of FIG. 2, or of another time aggregation circuit of the present technology. As shown, the time aggregation circuit 535 includes a first counter 535a (e.g., a first analog counter) and a second counter 535b (e.g., a second analog counter). The first counter 535a includes a capacitor 563a having a capacitance C1. A top plate of the capacitor 563a is selectively coupled to a current source 561a via a switch 532a (e.g., a transistor) based on a signal UP received from a corresponding event generating comparator (e.g., the first comparator 234a of FIG. 2) of a corresponding event vision pixel. The top plate of the capacitor 563a is further (a) selectively coupled to a reference voltage $V_{ref}$ via a switch 564a (e.g., a transistor) based on a reset signal RES, and (b) coupled to an input of a buffer or amplifier 565a. A bottom plate of the capacitor 563a is grounded. Additionally, an output of the amplifier 565a is selectively coupled to a column bitline 538 via a switch 566a (e.g., a transistor) based on an UP event readout signal $R_U$.

Similarly, the second counter 535b includes a capacitor 563b having a capacitance C2. A top plate of the capacitor 563b is selectively coupled to a current source 561b via a switch 532b (e.g., a transistor) based on a signal DOWN received from a corresponding event generating comparator (e.g., the second comparator 234b of FIG. 2) of a corresponding event vision pixel. The top plate of the capacitor 563b is further (a) selectively coupled to the reference voltage $V_{ref}$ via a switch 564b (e.g., a transistor) based on the reset signal RES, and (b) coupled to an input of a buffer or amplifier 565b. A bottom plate of the capacitor 563b is grounded. Additionally, an output of the amplifier 565b is selectively coupled to the column bitline 538 via a switch 566b (e.g., a transistor) based on a DOWN event readout signal $R_D$.

Figure 6:
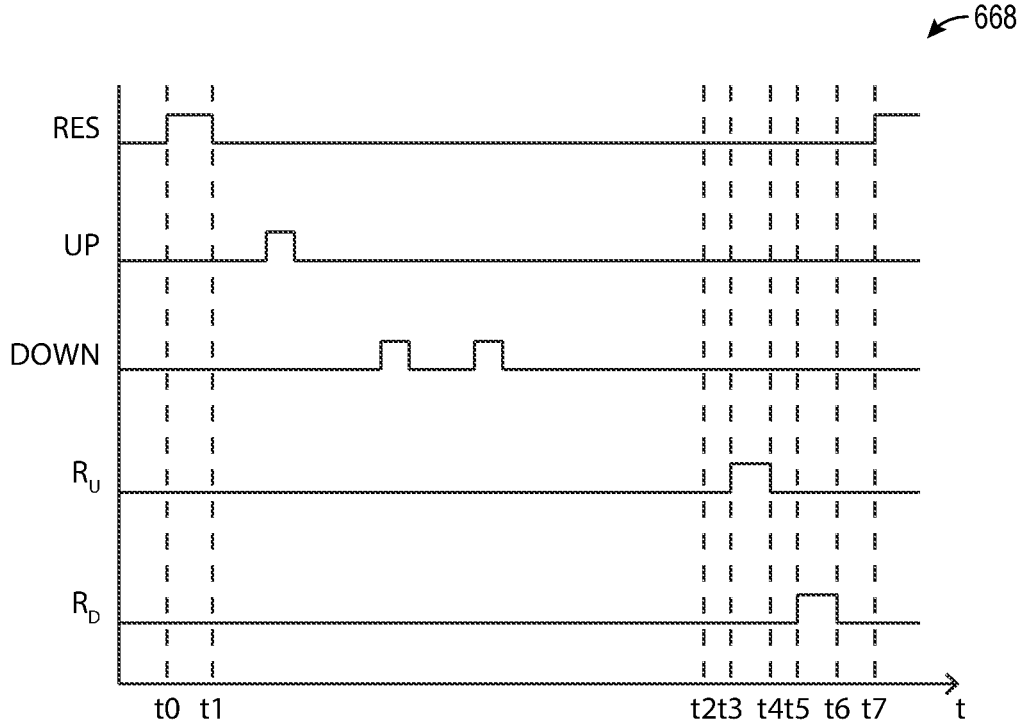
FIG. 6 is a signal diagram illustrating a method of operating the time aggregation circuit of FIG. 5, in accordance with various embodiments of the present technology.

FIG. 6 is an example signal diagram 668 illustrating a method of operating the time aggregation circuit 535 of FIG. 5, in accordance with various embodiments of the present technology. Referring to FIGS. 5 and 6 together, the reset signal RES is asserted at time t0 to selectively couple (a) the top plate of the capacitor 563a of the first counter 535a and the top plate of the capacitor 563b of the second counter 535b to (b) the reference voltage $V_{ref}$. Coupling the top plates of the capacitors 563a and 563b to the reference voltage $V_{ref}$ resets the voltage on the capacitors 563a and 563b to a known value. Although not shown, one or more latches in scanner and readout logic of a corresponding event vision pixel (e.g., latch(es) in the scanner and readout logic 236 of the event vision pixel 210 discussed above with reference to FIG. 2) can be reset at time t0 or another timing at or before time t1.

The reset signal RES is then unasserted at time t1 shown in FIG. 6, thereby uncoupling the top plates of the capacitors 563a and 563b from the reference voltage $V_{ref}$ and marking a beginning of a timing window between time t1 and time t2 during which the first and second counters 535a and 535b count the number of UP events and DOWN events, respectively, detected by the corresponding event vision pixel. In the illustrated example, the corresponding event vision pixel first detects one UP event and then detects two DOWN events during the timing window between time t1 and time t2. When the corresponding event vision pixel detects the UP event, the event vision pixel (e.g., an event generating comparator of the event vision pixel, such as the first comparator 234a of FIG. 2) pulses the signal UP. In turn, the top plate of the capacitor 563a of the first counter 535a is coupled to the current source 561a for the duration of the pulse, thereby decreasing the voltage at the capacitor 563a by an amount proportional to the duration of the pulse. In some embodiments, one or more latches in scanner and readout logic (e.g., the scanner and readout logic 236) of the corresponding event vision pixel can be triggered after detecting the UP event to indicate that the corresponding event vision pixel has detected at least one event during the timing window and to thereby request readout of the corresponding event vision pixel at or after an end of the timing window.

Similarly, when the corresponding event vision pixel detects the first DOWN event illustrated in FIG. 6, the event vision pixel (e.g., an event generating comparator of the event vision pixel, such as the second comparator 234b of FIG. 2) pulses the signal DOWN. In turn, the top plate of the capacitor 563b of the second counter 535b is coupled to the current source 561b for the duration of the pulse, thereby decreasing the voltage at the capacitor 563b by an amount proportional to the duration of the pulse. This process is repeated when the event vision pixel detects the second DOWN event illustrated in FIG. 6, thereby further decreasing the voltage at the capacitor 563b.

As discussed above, the current timing window ends at time t2. As shown in FIG. 6, the signal $R_U$ is asserted at time t3 (e.g., based at least in part on triggering of one or more latches in scanner and readout logic) to couple the output of the amplifier 565a of the first counter 535a to the column bitline 538. In turn, a first voltage value (representing an aggregate number of UP events detected by the event vision pixel during the timing window) is read out onto the column bitline 538. The signal $R_U$ is then unasserted at time t4 to uncouple the output of the amplifier 565a from the column bitline 538. Thereafter, the signal $R_D$ is asserted at time t5 (e.g., based at least in part on triggering of one or more latches in scanner and readout logic) to couple the output of the amplifier 565b of the second counter 535b to the column bitline 538. In turn, a second voltage value (representing an aggregate number of DOWN events detected by the event vision pixel during the timing window) is read out onto the column bitline 538. The signal $R_D$ is then unasserted at time t6 to uncouple the output of the amplifier 565b from the column bitline 538. The reset signal RES can then be asserted at time t7 in anticipation of the start of a next timing window.

Although the first voltage value from the first counter 535a is read out before the second voltage value from the second counter 535b in the embodiment illustrated in FIG. 6, the second voltage value can be read out before the first voltage value in other embodiments of the present technology. Additionally, or alternatively, the first counter 535a can be coupled to a column bitline different from the second counter 535b. In these embodiments, the first voltage value can be read out before, after, or while the second voltage value is read out.

It is possible for there to be a mismatch between the capacitance C1 of the capacitor 563a and the capacitance C2 of the capacitor 563b. Additionally, or alternatively, it is possible for there to be a mismatch between (i) the current $I_a$ supplied by the current source 561a to the top plate of the capacitor 563a and (ii) the current $I_b$ supplied by the current source 561b to the top plate of the capacitor 563b. Such mismatches can affect voltage values read out of the first counter 535a and/or the second counter 535b. Thus, in some embodiments, an event vision sensor can perform calibration techniques (e.g., at an event signal processor) on voltage values read out from the first counter 535a and/or the second counter 535b to account for (a) a mismatch between the capacitances C1 and C2 and/or (b) a mismatch between the currents $I_a$ and $I_b$.

Figure 7:
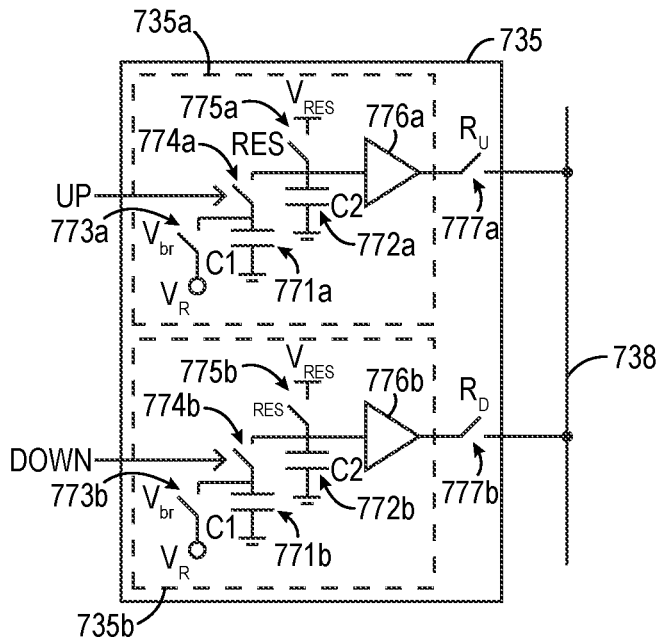
FIG. 7 is a partially schematic block diagram of still another time aggregation circuit configured in accordance with various embodiments of the present technology.

FIG. 7 is a partially schematic block diagram of another time aggregation circuit 735 configured in accordance with various embodiments of the present technology. It is appreciated that the illustrated time aggregation circuit 735 may be an example of the time aggregation circuit 235 included in the event vision pixel 210 of FIG. 2, or of another time aggregation circuit of the present technology. As shown, the time aggregation circuit 735 includes a first counter 735a (e.g., a first analog counter) and a second counter 735b (e.g., a second analog counter). The first counter 735a includes (i) a first capacitor 771a having a capacitance C1 and (ii) a second capacitor 772a having a capacitance C2. The second capacitance C2 can be greater than the first capacitance C1 is some embodiments. In other embodiments, the second capacitance C2 can be equal to or lesser than the first capacitance C1.

A top plate of the second capacitor 772a is selectively coupled to a reference voltage $V_{RES}$ via a switch 775a (e.g., a transistor) based on a reset signal RES. The top plate of the second capacitor 772a is further (a) coupled to an input of a buffer or amplifier 776a and (b) selectively coupled to a top plate of the first capacitor 771a via a switch 774a (e.g., a transistor) based on a signal UP received from a corresponding event generating comparator (e.g., the first comparator 234a of FIG. 2). The top plate of the first capacitor 771a is further selectively coupled to a reference voltage $V_R$ via a switch 773a (e.g., a transistor) based on a signal $V_{br}$. In some embodiments, the reference voltage $V_R$ can be equivalent to a voltage value that is less than the voltage value to which the reference voltage $V_{RES}$ is equivalent. In other embodiments, the reference voltage $V_R$ can be equivalent to a voltage value that is greater than or equal to the voltage value to which the reference voltage $V_{RES}$ is equivalent. The bottom plates of the first capacitor 771a and the second capacitor 772a are grounded. In addition, an output of the amplifier 776a is selectively coupled to a column bitline 738 via a switch 777a (e.g., a transistor) based on an UP event readout signal $R_U$.

Similarly, the second counter 735b includes (i) a first capacitor 771b having a capacitance C1 and (ii) a second capacitor 772b having a capacitance C2. The second capacitance C2 can be greater than the first capacitance C1 is some embodiments. In other embodiments, the second capacitance C2 can be equal to or lesser than the first capacitance C1. A top plate of the second capacitor 772b is selectively coupled to a reference voltage $V_{RES}$ via a switch 775b (e.g., a transistor) based on the reset signal RES. The top plate of the second capacitor 772b is further (a) coupled to an input of a buffer or amplifier 776b and (b) selectively coupled to a top plate of the first capacitor 771b via a switch 774b (e.g., a transistor) based on a signal DOWN received from a corresponding event generating comparator (e.g., the second comparator 234b of FIG. 2). The top plate of the first capacitor 771b is further selectively coupled to the reference voltage $V_R$ via a switch 773b (e.g., a transistor) based on the signal $V_{br}$. The signal $V_{br}$ can be the same signal as or a different signal from the signal $V_{br}$ used to selectively coupled the top plate of the first capacitor 771a of the first counter 735a to the reference voltage $V_R$. The bottom plates of the first capacitor 771b and the second capacitor 772b of the second counter 735b are grounded. In addition, an output of the amplifier 776b is selectively coupled to a column bitline 738 via a switch 777b (e.g., a transistor) based on a DOWN event readout signal $R_D$.

Figure 8:
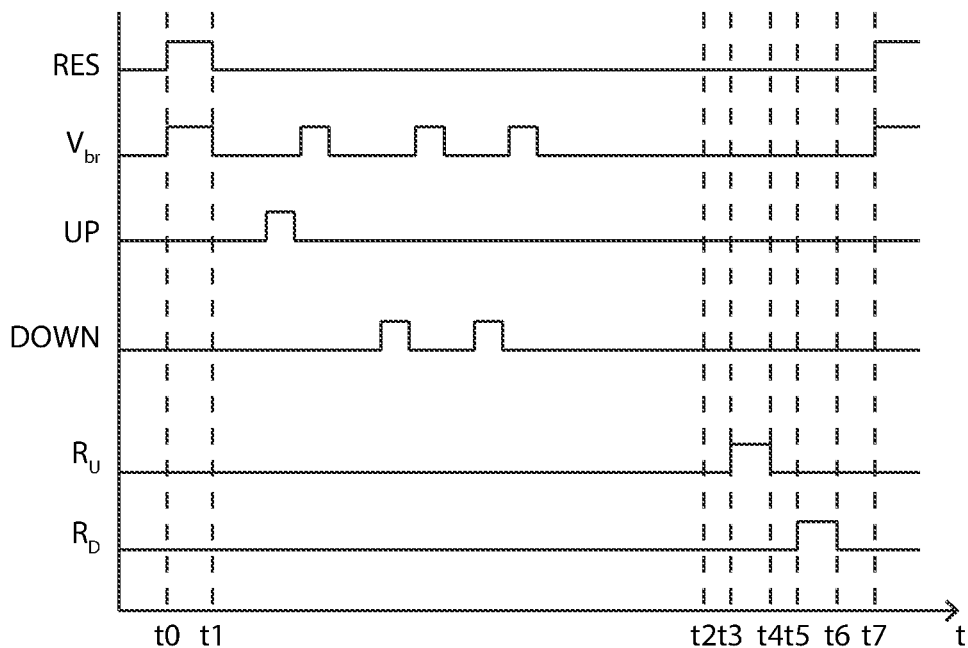
FIG. 8 is a signal diagram illustrating a method of operating the time aggregation circuit of FIG. 7, in accordance with various embodiments of the present technology.

FIG. 8 is an example signal diagram illustrating a method of operating the time aggregation circuit 735 of FIG. 7, in accordance with various embodiments of the present technology. Referring to FIGS. 7 and 8 together, the reset signal RES is asserted at time t0 to selectively couple (a) the top plate of the second capacitor 772a of the first counter 735a and the top plate of the second capacitor 772b of the second counter 735b to (b) the reference voltage $V_{RES}$. In addition, the signal $V_{br}$ is asserted at time t0 to selectively couple (a) the top plate of the first capacitor 771a of the first counter 735a and the top plate of the first capacitor 771b of the second counter 735b to (b) the reference voltage $V_R$. Although shown as both being asserted at time t0 in FIG. 8, the signal $V_{br}$ can be asserted before or after asserting the reset signal RES in other embodiments. Although not shown, one or more latches in scanner and readout logic of a corresponding event vision pixel (e.g., latch(es) in the scanner and readout logic 236 of the event vision pixel 210 discussed above with reference to FIG. 2) can be reset at time t0 or another timing at or before time t1.

The reset signal RES and the signal $V_{br}$ are then unasserted at time t1 shown in FIG. 8, thereby (i) uncoupling the top plates of the capacitors 771a and 771b from the reference voltage $V_R$, (ii) uncoupling the top plates of the capacitors 772a and 772b from the reference voltage $V_{RES}$, and (iii) marking a beginning of a timing window between time t1 and time t2 during which the first and second counters 735a and 735b count the number of UP events and DOWN events, respectively, detected by the corresponding event vision pixel. In the illustrated example, the corresponding event vision pixel first detects one UP event and then detects two DOWN events during the timing window between time t1 and time t2. When the corresponding event vision pixel detects the UP event, the event vision pixel (e.g., an event generating comparator of the event vision pixel, such as the first comparator 234a of FIG. 2) pulses the signal UP. In turn, the top plate of the first capacitor 771a of the first counter 735a is coupled to the top plate of the second capacitor 772a via the switch 774a for the duration of the pulse. As the top plates of the first and second capacitors 771a and 772a are coupled together, charge is shared amongst the capacitors 771a and 772a, and the voltage at the second capacitor 772a drops by an amount that is based at least in part on the reference voltage $V_R$ at the first capacitor 771a immediately before the switch 774a is activated. The signal UP is then unasserted to decouple the top plates of the capacitors 771a and 772a from one another. Afterwards, the signal $V_{br}$ is asserted to activate the switch 773a and restore the voltage at the first capacitor 771a to the reference voltage $V_R$. Thereafter, the signal $V_{br}$ is unasserted. In some embodiments, one or more latches in scanner and readout logic (e.g., the scanner and readout logic 236) of the corresponding event vision pixel can be triggered after detecting the UP event to indicate that the corresponding event vision pixel has detected at least one event during the timing window and to thereby request readout of the corresponding event vision pixel at or after an end of the timing window.

Although not shown, the time aggregation circuit 735 and/or the event vision pixel 210 can include circuitry to control timings of when the signal $V_{br}$ is asserted following assertion of the signal UP or the signal DOWN. For example, the time aggregation circuit 735 and/or the event vision pixel 210 can include a logic gate (e.g., an 'OR' logic gate) coupled to the outputs of the event generating comparators 234. An output of the logic gate can be used to assert the signal $V_{br}$ whenever the event generating comparators 234 detect an event. Delay elements can be coupled to an output of the logic gate and configured to introduce a delay on the output such that the switches 773a and/or 773b are not activated until after the signal UP or the signal DOWN has been pulsed to activate the switch 774a or the switch 774b, respectively, to couple the top plates of the capacitors 771 and 772 of the corresponding counter 735 together. In other words, the delay elements can be configured such that the signal $V_{br}$ is not asserted at a same time that the signal UP or the signal DOWN is asserted.

When the corresponding event vision pixel detects the first DOWN event illustrated in FIG. 8, the event vision pixel (e.g., an event generating comparator of the event vision pixel, such as the second comparator 234b of FIG. 2) pulses the signal DOWN, thereby activating the switch 774b and coupling the top plate of the first capacitor 771b of the second counter 735b to the top plate of the second capacitor 772b. In turn, (i) charge is shared amongst the capacitors 771b and 772b and (ii) the voltage at the second capacitor 772b drops by an amount that is based at least in part on the reference voltage $V_R$ at the first capacitor 771b immediately before the switch 774b is activated. The signal DOWN is then unasserted to decouple the top plates of the capacitors 771b and 772b. Afterwards, the signal $V_{br}$ is asserted to activate the switch 773b and restore the voltage at the first capacitor 771b to the reference voltage $V_R$. Thereafter, the signal $V_{br}$ is unasserted. This process is repeated when the event vision pixel detects the second DOWN event illustrated in FIG. 8, thereby further decreasing the voltage at the second capacitor 772b.

As discussed above, the current timing window ends at time t2. As shown in FIG. 8, the signal $R_U$ is asserted at time t3 (e.g., based at least in part on triggering of one or more latches in scanner and readout logic) to couple the output of the amplifier 776a of the first counter 735a to the column bitline 738. In turn, a first voltage value (representing an aggregate number of UP events detected by the event vision pixel during the timing window) is read out onto the column bitline 738. The signal $R_U$ is then unasserted at time t4 to uncouple the output of the amplifier 776a from the column bitline 738. Thereafter, the signal $R_D$ is asserted at time t5 (e.g., based at least in part on triggering of one or more latches in scanner and readout logic) to couple the output of the amplifier 776b of the second counter 735b to the column bitline 738. In turn, a second voltage value (representing an aggregate number of DOWN events detected by the event vision pixel during the timing window) is read out onto the column bitline 738. The signal $R_D$ is then unasserted at time t6 to uncouple the output of the amplifier 776b from the column bitline 738. The reset signal RES and the signal $V_{br}$ can then be asserted at time t7 in anticipation of the start of a next timing window.

Although the first voltage value from the first counter 735a is read out before the second voltage value from the second counter 735b in the embodiment illustrated in FIG. 8, the second voltage value can be read out before the first voltage value in other embodiments of the present technology. Additionally, or alternatively, the first counter 735a can be coupled to a column bitline different from the second counter 735b. In these embodiments, the first voltage value can be read out before, after, or while the second voltage value is read out.

Note that, in comparison to the first and second voltage values read out from the first and second counters 535a and 535b of FIG. 5, the first and second voltages read out from the first and second counters 735a and 735b of FIG. 7 are not dependent upon absolute currents or absolute capacitances of current sources or capacitors, respectively. Instead, the voltage values read out from each of the counters 735a and 735b depend upon a ratio of the capacitances of the corresponding capacitors within the respective one of the counters 735a or 735b. Thus, calibration techniques to account for any mismatch between the capacitances of capacitors in the counters 735a and 735b or between current sources is not required. Nevertheless, the voltage drop that occurs on the second capacitor 772a when an UP event is detected during a given timing window can get smaller for each successive UP event that is detected during that given timing window. Similarly, the voltage drop that occurs on the second capacitor 772b when a DOWN event is detected during a given timing window can get smaller for each successive DOWN event that is detected during that given timing window. Thus, the event vision sensor can perform calibration techniques (e.g., at an event signal processor) to account for such non-linearity.

Further note that the time aggregation circuit 535 of FIG. 5 and the time aggregation circuit 735 of FIG. 7 are similar to the time aggregation circuit 335 of FIG. 3 in that each circuit includes (i) a first counter to count a number of UP events detected by a corresponding event vision pixel during a timing window and (ii) a second counter to count a number of DOWN events detected by a corresponding event vision pixel during a timing window. Thus, an event vision sensor having event vision pixels that employ time aggregation circuits 535 and/or time aggregation circuits 735 can utilize the event data compression procedures discussed in detail above with reference to FIG. 4.

Figure 9:
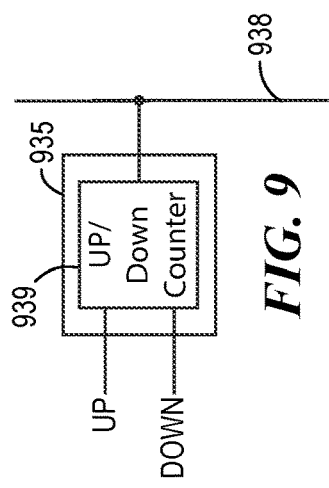
FIG. 9 is a partially schematic block diagram of yet another time aggregation circuit configured in accordance with various embodiments of the present technology.

FIG. 9 is a partially schematic block diagram of another time aggregation circuit 935 configured in accordance with various embodiments of the present technology. It is appreciated that the illustrated time aggregation circuit 935 may be an example of the time aggregation circuit 235 included in the event vision pixel 210 of FIG. 2, or of another time aggregation circuit of the present technology. As shown, the time aggregation circuit 935 includes an up/down counter 939. The up/down counter 939 includes two inputs. A first input is configured to receive a signal UP from a corresponding event generating comparator, such as the first comparator 234a of FIG. 2. The second input is configured to receive a signal DOWN from a corresponding event generating comparator, such as the second comparator 234b of FIG. 2. The up/down counter 939 further includes an output coupled to a column bitline 938.

In operation, the up/down counter 939 is configured to track events detected by a corresponding event vision pixel during a given timing window. In comparison to the other counters discussed above, the up/down counter 939 does not necessarily output the total number of UP events or the total number of DOWN events detected by the corresponding event vision pixel during the given timing window. Rather, the up/down counter 939 outputs a difference between (i) the number of UP events detected by the corresponding event vision pixel during the timing window and (ii) the number of DOWN events detected by the corresponding event vision pixel.

Figure 10:
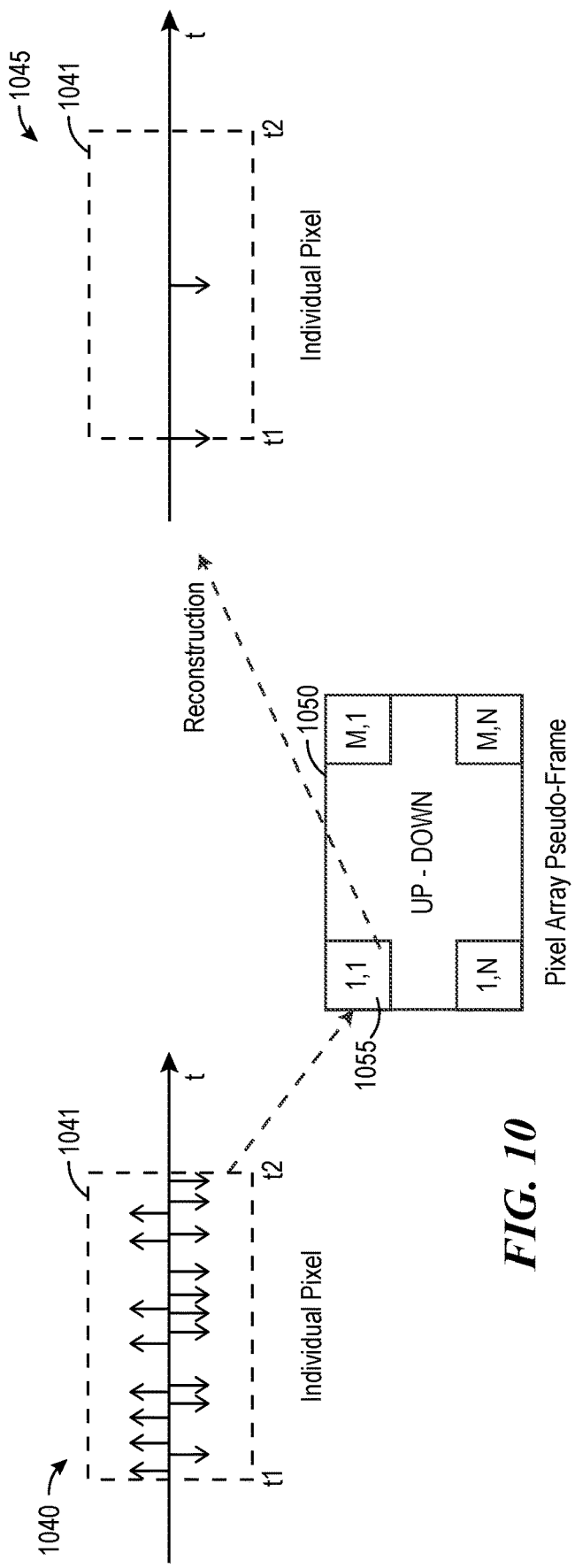
FIG. 10 is a diagram illustrating another method of event data compression in accordance with various embodiments of the present technology.

For the sake of clarity and understanding, consider FIG. 10 that illustrates an overview of event data compression that can be performed using the time aggregation circuit 935 of FIG. 9 in accordance with various embodiments of the present technology. FIG. 10 includes a plot 1041 of UP events and DOWN events detected by an event vision pixel over a timing window 1041 between time t1 and time t2. The plot 1040 is similar to the plot 440 of FIG. 4. For example, the plot 1040 illustrates that the corresponding event vision pixel detected eight (8) UP events and ten (10) DOWN events during the timing window 1041 and in the order shown. These events can be tracked using the up/down counter 939 of the time aggregation circuit 935 of FIG. 9. Rather than outputting two values that respectively indicate the absolute number of UP events or DOWN events detected by the event vision pixel during the timing window 1041, the up/down counter 939 can output a value (e.g., a single value) representing the difference between the number of UP events detected and the number of DOWN events detected during the timing window 1041. Thus, in the illustrated example, the up/down counter 939 can output a value onto the column bitline 938 that indicates that, during the timing window 1041, two more DOWN events were detected by the event vision pixel than UP events.

Note that the value output onto the column bitline 938 by the counter 939 merely reflects the difference between the number of UP events and the number of DOWN events detected by the event vision pixel during the timing window 1041. Stated another way, the value output onto the column bitline 939 does not reflect the exact timing of when, during the timing window 1041, each individual event was detected by the event vision pixel, nor does the value necessarily indicate the absolute number of UP events or DOWN events that were detected during the timing window 1041. Therefore, such in-pixel compression of event data performed by the event vision pixel can be considered a form of lossy compression in which event data and temporal information of individual events is lost.

Similar to the event data discussed above with reference to FIG. 4, values read out onto the column bitline 938 can be combined with other values read out of other event vision pixels of an event vision sensor to form pseudo-frames. For example, as shown in FIG. 10, the value read out of the up/down counter 939 onto the column bitline 938 for the timing window 1041 can be combined with other values read out of other event vision pixels for the same timing window 1041 to form a pseudo-frame 1050. Thereafter, as discussed in greater detail below with reference to FIG. 11, the event vision sensor can optionally perform compression on the pseudo-frame 1050.

Frames of event count differences read out of event vision pixels of an array for different timing windows are also referred to herein as 'pseudo-frames' because event data included in each such pseudo-frame represents the difference between the number of UP events and the number of DOWN events detected by the event vision pixel during a given timing window, which is proportional to a change of contrast or a change of information in an external scene. By contrast, as discussed above, frames of image data conventionally relate to an exposure time, and the image data represents an amount of photon/electrons that are generated by light incident on a photosensor of each pixel during the exposure time.

FIG. 10 further includes a plot 1045 illustrating reconstruction of event data based on the pseudo-frame 1050. More specifically, event data corresponding to the plot 1040 and to the event vision pixel for the timing window 1041 can be reconstructed using relevant event data 1055 stored in the pseudo-frame 1050. As discussed above, the absolute number of UP events detected by the event vision pixel during the timing window 1041, the absolute number of DOWN events detected by the event vision pixel during the timing window 1041, and/or temporal information regarding exactly when each of the individual events occurred during the timing window 1041 can be lost during in-pixel compression of the event data. Therefore, assumptions can be made during reconstruction regarding the number of events detected by the event vision pixel during the timing window 1041 and regarding when each individual event occurred within the timing window 1041. In the illustrated example, it is assumed that the event vision pixel detected two DOWN events and zero UP events during the timing window 1041 based on the difference value output onto the column bitline 938 by the up/down counter down counter 939 above. It is further assumed that the event vision pixel detected the two DOWN events at uniform intervals across the timing window 1041. Thus, during reconstruction, the two DOWN events can be uniformly distributed across the timing window 1041 as shown in the plot 1045.

Other assumptions regarding (i) the number of UP or DOWN events detected by the event vision pixel during a timing window 1041 and/or (ii) the distribution of UP events and/or DOWN events across the timing window are of course possible and within the scope of the present technology. Additionally, or alternatively, different assumptions can be made for UP events than for DOWN events, and/or multiple assumptions can be made for UP events or for DOWN events during reconstruction such that the distribution of UP events and/or DOWN events can vary across a timing window. Moreover, for a same pseudo-frame, assumptions made during reconstruction of event data corresponding to one event vision pixel can but need not be the same as assumptions made during reconstruction of event data corresponding to another event vision pixel. Further, for different pseudo-frames (e.g., pseudo-frames corresponding to different timing windows), assumptions made during reconstruction of event data corresponding to an event vision pixel can but need not be the same across the different pseudo-frames.

Figure 11:
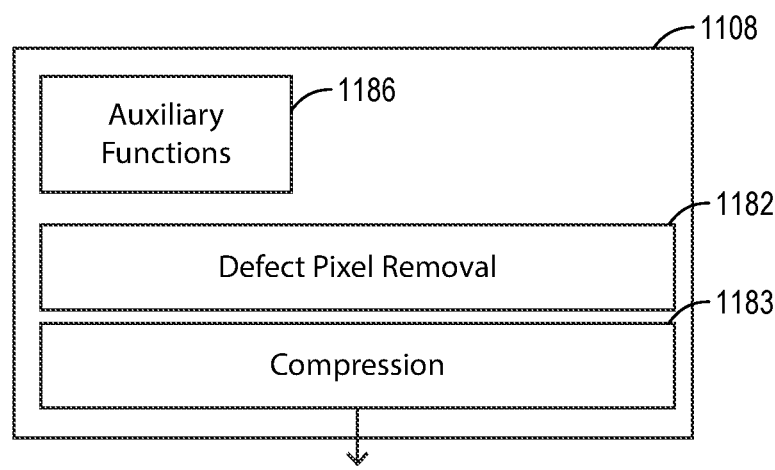
FIG. 11 is a partially schematic block diagram of an event signal processor configured in accordance with various embodiments of the present technology.

FIG. 11 is a partially schematic block diagram of an event signal processor 1108 configured in accordance with various embodiments of the present technology. It is appreciated that the illustrated event signal processor 1108 may be an example of the event signal processor 108 of the event vision sensor 100 of FIG. 1, or of another event signal processor of the present technology. As shown, the event signal processor 1108 includes a defect pixel removal block 1182, a compression block 1183, and an auxiliary functions block 1186. The defect pixel removal block 1182 can be used to remove pixel signals corresponding to defective event vision pixels of an array (e.g., the array 102 of FIG. 1). The auxiliary functions block 1186 can include one or more other stages or circuits for performing various auxiliary processing functions.

As discussed above, event vision sensors configured in accordance with the present technology can form pseudo-frames using event data read out from time aggregation circuits or stages of event vision pixels in an array. These pseudo-frames can often include event data that appear as shapes or objects, meaning that compression algorithms (e.g., wavelet compression algorithms) can be applied to the pseudo-frames to compress the event data in addition to or in lieu of the in-pixel compression performed by time aggregation circuits of event vision pixels. Therefore, the compression block 1183 of the event signal processor 1108 can be used to compress event data at the pseudo-frame level. In some embodiments, the compression block 1183 can utilize lossy compression algorithms to compress pseudo-frames. Examples of lossy compression algorithms that can be used include Joint Photographic Experts Group (JPEG) compression, Advanced Video Coding (AVC) compression (also known as H264 compression), and High Efficiency Video Coding (HEVC) compression (also known as H265 compression). In these and other embodiments, the compression block 1183 of the event signal processor 1108 can utilize lossless compression algorithms, such as Moving Picture Experts Group (MPEG) compression.

Although not shown in FIG. 11, the event signal processor 1108 can additionally include other circuits or blocks for performing specific processing functions. For example, the event signal processor 1108 can include a segmentation classifier block and/or a shape classifier block that can be used to classify segments and shapes, respectively, of event data read out from the array. As another example, the event signal processor 1108 can include an optical flow estimation block that can be used to identify pixel-wise, shape-wise, or segmentation-wise motions over time and/or between consecutive readouts (e.g., using correlation-based, block-matching-based, feature-tracking-based, energy-based, and/or gradient-based optical flow estimation). Additionally, or alternatively, the event signal processor 1108 can include a set of one or more buffers (e.g., a set of line buffers) that are operably coupled to one or more of the blocks or circuits of the event signal processor 1108 to perform various processing functions.

Figure 12:
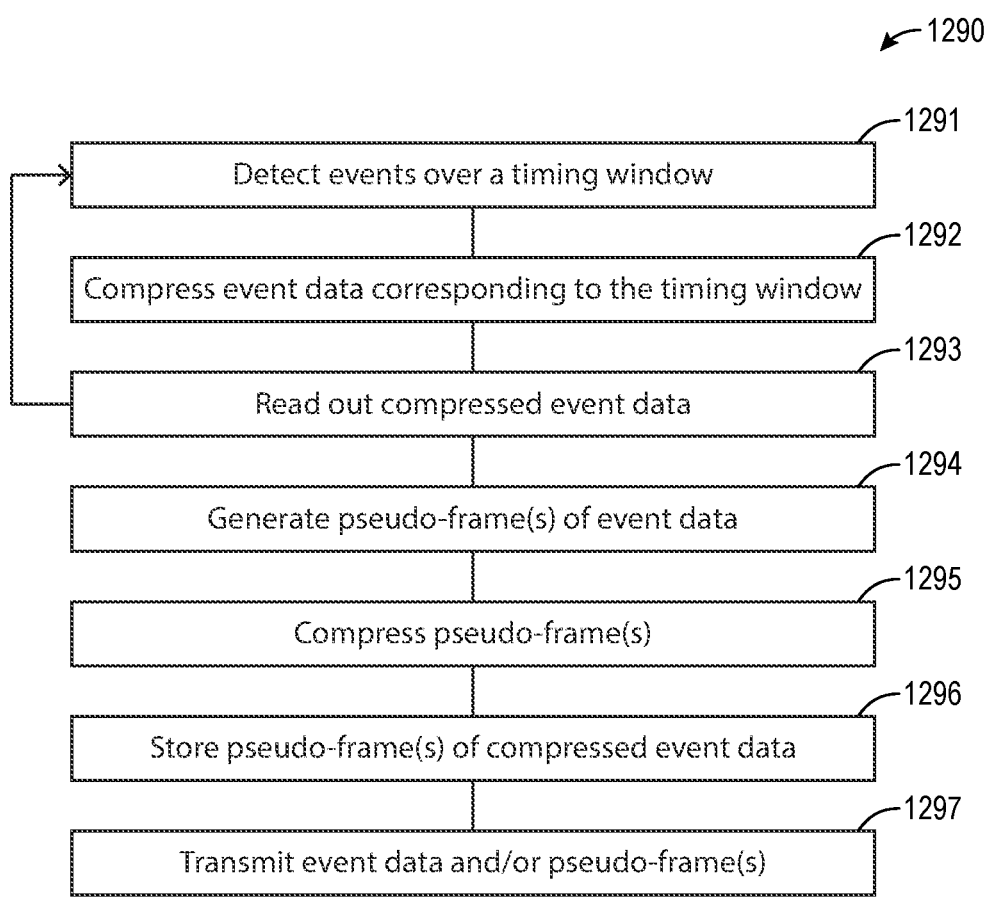
FIG. 12 is a flow diagram illustrating a method of operating an event vision sensor in accordance with various embodiments of the present technology.

FIG. 12 is a flow diagram illustrating a method 1290 of operating an event vision sensor (e.g., the event vision sensor 100 of FIG. 1) in accordance with various embodiments of the present technology. The method 1290 is illustrated as a set of steps or blocks 1291-1297. All or a subset of one or more of the blocks 1291-1297 can be executed by various components of an event vision sensor. For example, all or a subset of one or more of the blocks 1291-1297 can be executed by (i) an individual event vision pixel (e.g., one or more event generating comparators 234 and/or or a time aggregation circuit or stage of the event vision pixel), (ii) an array of event vision pixels, (iii) row control circuitry, (iv) column control circuitry, (v) an event signal processor, (vi) memory, and/or (vii) a transmitter. Furthermore, any one or more of the blocks 1291-1297 can be executed in accordance with the discussion of FIGS. 1-11 above.

The method 1290 of FIG. 12 begins at block 1291 by detecting events that occur over a timing window. Detecting events that occur over a timing window can include detecting one or more UP events and/or DOWN events that occur over the timing window and/or correspond to activity in an external scene.

At block 1292, the method 1290 continues by compressing event data corresponding to the timing window. In some embodiments, compressing the generated event data can include compressing event data generated by at least one event vision pixel of an event vision sensor and/or before reading out the event data from the at least one event vision pixel. In these and other embodiments, compressing the event data can include compressing the event data using a time aggregation stage (e.g., of a corresponding event vision pixel). Compressing the event data using the time aggregation stage can include compressing the event data using one or more counters. In some embodiments, compressing the event data includes tracking events detected during a given timing window or over a period of time. For example, compressing the event data can include tracking or counting (i) an absolute number of UP events detected by an event vision pixel (e.g., over the timing window) and/or (ii) an absolute number of DOWN events detected by an event vision pixel (e.g., over the timing window). In these and other embodiments, compressing the event data can include tracking or computing a difference between (a) a number of UP events detected by an event vision pixel (e.g., over the timing window) and (b) a number of DOWN events detected by an event vision pixel (e.g., over the timing window).

At block 1293, the method 1290 continues by reading out compressed event data from event vision pixels. In some embodiments, reading out the compressed event data can include reading out an absolute number of UP events detected by an event vision pixel (e.g., over a timing window) and/or reading out an absolute number of DOWN events detected by an event vision pixel (e.g., over a timing window). In these and other embodiments, reading out the compressed event data can include reading out a difference between (a) a number of UP events detected by an event vision pixel (e.g., over a timing window) and (b) a number of DOWN events detected by an event vision pixel (e.g., over a timing window).

In some embodiments, reading out the compressed event data can include reading out compressed event data from an event vision pixel only when the event vision pixel has detected at least one event during a given timing window. For example, compressed event data (an UP event count, a DOWN event count, or a difference between an UP event count and a DOWN event count) corresponding to a given timing window can be read out of an event vision pixel only when the event vision pixel has detected at least one event (an UP event or a DOWN event) during the given timing window. As another example, an UP event count can be read out of an event vision pixel as compressed event data only when the event vision pixel has detected at least one UP event during a corresponding given timing window. Additionally, or alternatively, a DOWN event count can be read out of an event vision pixel as compressed event data only when the event vision pixel has detected at least one DOWN event during a corresponding given timing window.

At block 1294, the method 1290 continues by generating pseudo-frames using compressed event data read out of one or more event vision pixels. Generating pseudo-frames can include combining or correlating compressed event data read out of a first event vision pixel for a given timing window with compressed event data read out of at least one other event vision pixel for the given timing window. In some embodiments, generating pseudo-frames can include generating (i) a first pseudo-frame using first compressed event data read out of a first set of event vision pixels, the first compressed event data representing a number of UP events detected by the first set of event vision pixels for a given timing window; and/or (ii) a second pseudo-frame using second compressed event data read out of a second set of event vision pixels, the second compressed event data representing a number of DOWN events detected by the second set of event vision pixels for the given timing window. The first set of event vision pixels can include a same or different group of event vision pixels as the second set of event vision pixels.

At block 1295, the method 1290 continues by performing compression on one or more pseudo-frames generated at block 1294. In some embodiments, performing compression on the one or more pseudo-frames can include performing lossy compression on the one or more pseudo-frames. For example, performing compression on the one or more pseudo-frames can include performing JPEG, H264, and/or H265 on the one or more pseudo-frames. In these and other embodiments, performing compression on the one or more pseudo-frames can include performing lossless compression on the one or more pseudo-frames. For example, performing compression on the one or more pseudo-frames can include performing MPEG on the one or more pseudo-frames.

At block 1296, the method 1290 continues by storing the compressed event data and/or pseudo-frames. Storing the event data and/or pseudo-frames can include storing the event data and/or pseudo-frames to memory, such as to a buffer of an event vision sensor.

At block 1297, the method 1290 continues by transmitting the event data and/or pseudo-frames. Transmitting the event data and/or pseudo-frames can include transmitting the event data and/or pseudo-frames out of an event vision sensor and/or to a receiver of a corresponding imaging system.

Although the blocks 1291-1297 of the method 1290 are discussed and illustrated in a particular order, the method 1290 illustrated in FIG. 12 is not so limited. In other embodiments, the method 1290 can be performed in a different order. In these and other embodiments, any of the blocks 1291-1297 of the method 1290 can be performed before, during, and/or after any of the other blocks 1291-1297 of the method 1290. For example, block 1295 can be performed while generating pseudo-frames at block 1294.

As another example, block 1296 can be performed before or while performing blocks 1294 and/or 1295. As still another example, blocks 1291, 1292, and/or 1293 can be performed while performing one or more of blocks 1294-1297. Moreover, a person of ordinary skill in the relevant art will recognize that the illustrated method 1290 can be altered and still remain within these and other embodiments of the present technology. For example, one or more blocks 1291-1297 of the method 1290 can be omitted and/or repeated in some embodiments. As a specific example, block 1292 can be omitted in some embodiments (e.g., in embodiments in which an event vision sensor performs frame-level compression on pseudo-frames at block 1295 but not in-pixel compression on events detected at the pixel level). As another specific example, block 1295 can be omitted in some embodiments (e.g., in embodiments in which an event vision sensor performs in-pixel compression on events detected at the pixel level but does not perform frame-level compression on pseudo-frames). As still another specific example, block 1296 and/or block 1297 can be omitted in some embodiments (e.g., in embodiments in which at least some of the event data read out of event vision pixels and/or used to form one or more pseudo-frames is discarded rather than being stored to memory and/or transmitted out of the corresponding event vision sensor).

As discussed above, the present technology facilitates compressing event data in-pixel and/or at the pseudo-frame level. As a result, the amount of data stored to memory (e.g., buffers) of an event vision sensor configured in accordance with various embodiments of the present technology to record events detected by event vision pixels of the event vision sensor can be reduced in comparison to the amount of data used to record events in event vision sensor that do not perform such compression. As a result, the number of events that can be stored to a fixed amount of memory using event vision sensors of the present technology can be increased in comparison with other event vision sensors. In some cases, the present technology can therefore facilitate longer recording times before the fixed amount of memory becomes full.

One application of the present technology includes high speed video capture. For example, an active pixel sensor can be used to capture image data (e.g., a video) of an external scene while an event vision sensor can be used to capture event data corresponding activity that occurs within the external scene. Event data captured and compressed by the event vision sensor can be decompressed and synthesized with the image data captured using the active pixel sensor. As such, the present technology can be used to detect and/or record high speed components of activity occurring in the external scene, which can be useful, for example, in capturing slow motion videos.

Although several embodiments of the present technology are discussed above in the context of counting and compressing events at the individual pixel level, the present technology is not so limited. For example, event vision pixels included in an array of such pixels in an event vision sensor can be organized into blocks or groups. In some embodiments, one or more time aggregation circuits can be shared amongst event vision pixels of a group. Continuing with this example, the one or more time aggregation circuits can include one or more counters configured to count (a) UP events detected by event vision pixels of the group, (b) DOWN events detected by event vision pixels of the group, and/or (c) a difference between a number of UP events detected by event vision pixels of the group and a number of DOWN events detected by event vision pixels of the group. The one or more time aggregation circuits can be positioned within one or more event vision pixels of the group, or can be peripheral circuits that are positioned outside of the event vision pixels. Event data generated by the one or more time aggregation circuits can be read out and combined with event data corresponding to one or more other groups of event vision pixels to form one or more pseudo-frames. An event vision sensor can then optionally perform frame-level compression on such pseudo-frames.

In still other embodiments of the present technology, event vision pixels can include time aggregation circuits that merely count a number of UP events and/or DOWN events that are detected by the event vision pixels over a given timing window. At or after the end of the given timing window, UP event counts and/or DOWN event counts can be output to peripheral circuitry to, for example, compute one or more differences between the number of UP events detected by the event vision pixels for the given timing window and the number of DOWN events detected by the event vision pixels for the given timing window. The one or more differences can then be read and used to generate one or more pseudo-frames, on which an event vision sensor can optionally perform frame-level compression.

C. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. An event vision pixel, comprising:
a photosensor configured to generate photocurrent in response to incident light received from an external scene;
a photocurrent-to-voltage converter coupled to the photosensor to convert the photocurrent to a voltage;
a difference detecting circuit coupled to the photocurrent-to-voltage converter to generate a filtered and amplified signal in response to differences that are detected in the voltage received from the photocurrent-to-voltage converter over time;
event generating comparators coupled to the difference detecting circuit to detect events that occur within the external scene based on a comparison of the filtered and amplified signal with one or more thresholds; and
a time aggregation circuit coupled to the event generating comparators to track an aggregate number of events detected by the event generating comparators over a specified timing window.

2. The event vision pixel of claim 1, wherein the time aggregation circuit includes at least one counter configured to count the aggregate number of events detected by the event generating comparators over the specified timing window.

3. The event vision pixel of claim 2, wherein the at least one counter includes:
a first capacitor having a top plate and a grounded bottom plate, wherein the top plate of the first capacitor is selectively coupled to a first reference voltage via a first switch and based on a first reset signal; and
a second capacitor having a top plate and a grounded bottom plate, wherein the top plate of the second capacitor is (a) selectively coupled to the top plate of the first capacitor via a second switch and based on an event signal received from the event generating comparators, (b) selectively coupled to a second reference voltage via a third switch and based on a second reset signal, and (c) selectively coupled to a column bitline (i) via an amplifier and a fourth switch and (ii) based on a readout signal.

4. The event vision pixel of claim 2, wherein the at least one counter includes:
a first counter configured to track an aggregate number of UP events detected by the event generating comparators over the specified timing window, each of the UP events corresponding to a change in the incident light from darker to brighter; and
a second counter configured to track an aggregate number of DOWN events detected by the event generating comparators over the specified timing window, each of the DOWN events corresponding to a change in the incident light from brighter to darker.

5. The event vision pixel of claim 1, further comprising readout logic coupled to an output of the event generating comparators, wherein the readout logic includes a latch that is triggered when the event generating comparators detect at least one event over the specified timing window.

6. An event vision sensor, comprising:
a plurality of event vision pixels,
wherein:
each event vision pixel of the plurality is configured to generate event data based at least in part on events indicated in incident light received from an external scene,
each event vision pixel of the plurality includes a compression circuit configured to compress the event data prior to readout of the event data from the event vision pixel.

7. The event vision sensor of claim 6, wherein:
each compression circuit includes a time aggregation circuit; and
to compress the event data, the time aggregation circuit is configured to track a number of the events detected by the corresponding event vision pixel over a specified timing window.

8. The event vision sensor of claim 7, wherein each time aggregation circuit includes at least one counter configured to count the number of the events detected by the corresponding event vision pixel over the specified timing window.

9. The event vision sensor of claim 7, wherein:
each time aggregation circuit includes an up/down counter configured to track a difference between (a) a number of UP events detected by the corresponding event vision pixel over the specified timing window and (b) a number of DOWN events detected by the corresponding event vision pixel over the specified timing window;
each of the UP events corresponds to a change in the incident light from darker to brighter; and
each of the DOWN events corresponds to a change in the incident light from brighter to darker.

10. The event vision sensor of claim 7, wherein each event vision pixel of the plurality further includes readout logic including at least one latch that is triggered when the corresponding event vision pixel detects at least one event over the specified timing window.

11. The event vision sensor of claim 6, wherein the event vision sensor is configured to form a pseudo-frame based at least in part on event data readout of one or more event vision pixels of the plurality.

12. The event vision sensor of claim 11, further comprising an event signal processor configured to execute a compression algorithm on the pseudo-frame.

13. The event vision sensor of claim 12, wherein the event signal processor is configured to execute a lossy compression algorithm on the pseudo-frame.

14. The event vision sensor of claim 13, wherein the lossy compression algorithm includes Joint Photographic Experts Group (JPEG) compression, Advanced Video Coding (AVC) compression (also known as H264 compression), High Efficiency Video Coding (HEVC) compression (also known as H265 compression), or any combination thereof.

15. A method of operating an event vision sensor including one or more event vision pixels, the method comprising:
for each individual event vision pixel of the one or more event vision pixels—
detecting events indicated in incident light received from an external scene over a timing window, and
tracking a number of the events detected over the timing window.

16. The method of claim 15, wherein:
tracking the number of events detected over the timing window includes (a) tracking a number of UP events detected over the timing window and (b) tracking a number of DOWN events detected over the timing window;
each of the UP events corresponds to a change in the incident light from darker to brighter; and
each of the DOWN events corresponding to a change in the incident light from brighter to darker.

17. The method of claim 15, wherein:
tracking the number of events detected over the timing window includes tracking a difference between (a) a number of UP events detected over the timing window and (b) a number of DOWN events detected over the timing window;
each of the UP events corresponds to a change in the incident light from darker to brighter; and
each of the DOWN events corresponds to a change in the incident light from brighter to darker.

18. The method of claim 15, further comprising, at or after an end of the timing window, reading out the number of the events detected by at least one of the one or more event vision pixels over the timing window.

19. The method of claim 15, further comprising, for each of the individual event vision pixels of the one or more event vision pixels, reading out the number of the events detected over the timing window only when the individual event vision pixel detected at least one event during the timing window.

20. The method of claim 15, further comprising forming a pseudo-frame corresponding to the timing window based at least in part on the numbers of events detected by all or a subset of the one or more event vision pixels over the timing window.

21. The method of claim 20, wherein:
the pseudo-frame is a first pseudo-frame and the subset is a first subset;
forming the first pseudo-frame includes forming the first pseudo-frame based at least in part on the numbers of UP events detected by all or the first subset of the one or more event vision pixels over the timing window;
each of the UP events corresponds to a change in the incident light from darker to brighter;
the method further comprises forming a second pseudo-frame corresponding to the timing window based at least in part on the numbers of DOWN events detected by all or a second subset of the one or more event vision pixels over the timing window; and
each of the DOWN events corresponds to a change in the incident light from brighter to darker.

22. The method of claim 20, further comprising performing frame-level compression on the pseudo-frame.

23. The method of claim 15, wherein tracking the number of the events detected over the timing window includes:
resetting a counter at or before a beginning of the timing window; and
counting the number of the events using the counter.

* * * * *